Sept. 8, 1970 W. D. MUNDINGER 3,527,503
PNEUMATIC OUTLET ASSEMBLY FOR HOPPERS
Filed Aug. 5, 1968 4 Sheets-Sheet 1
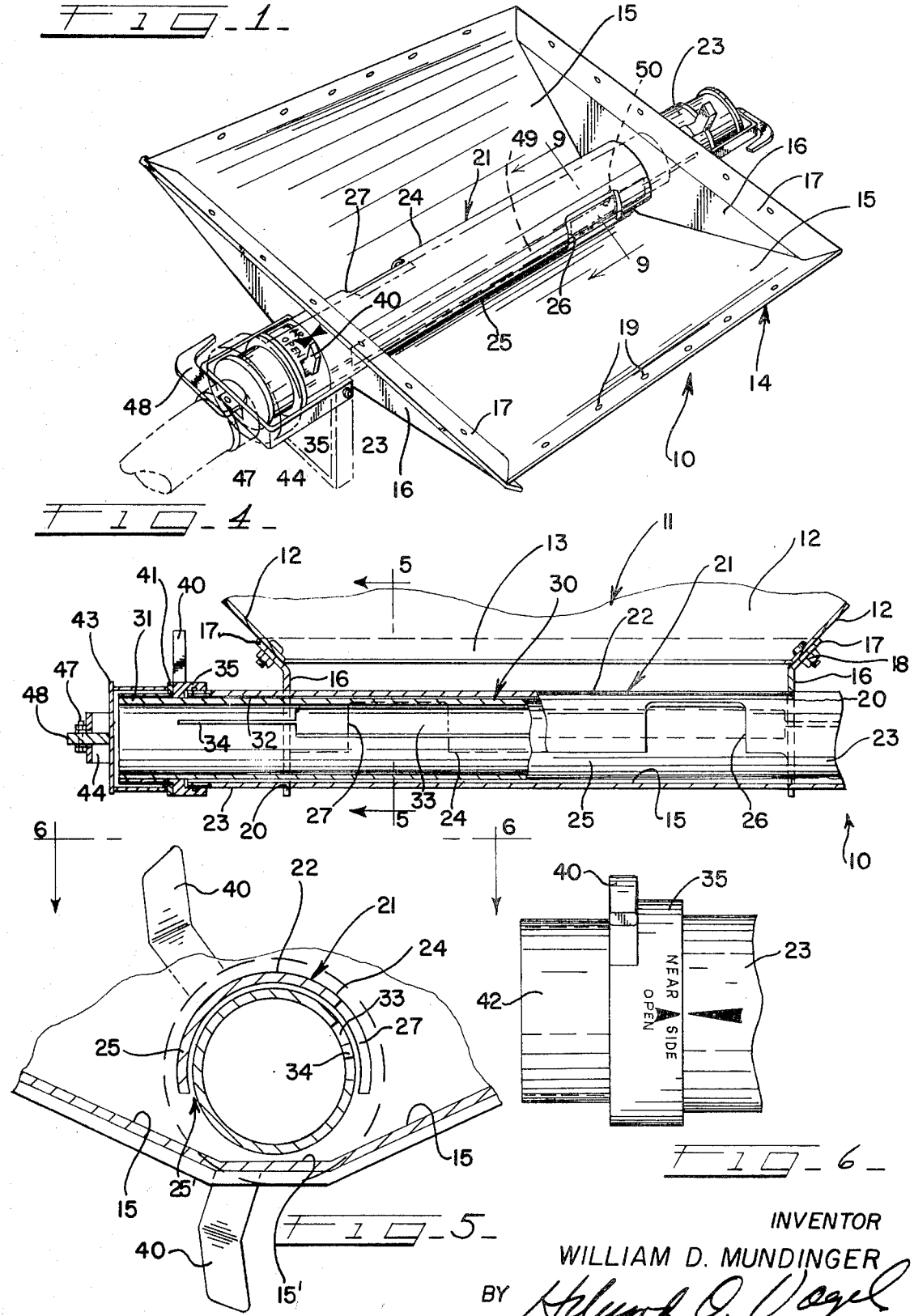
INVENTOR
WILLIAM D. MUNDINGER
BY
ATT'Y.

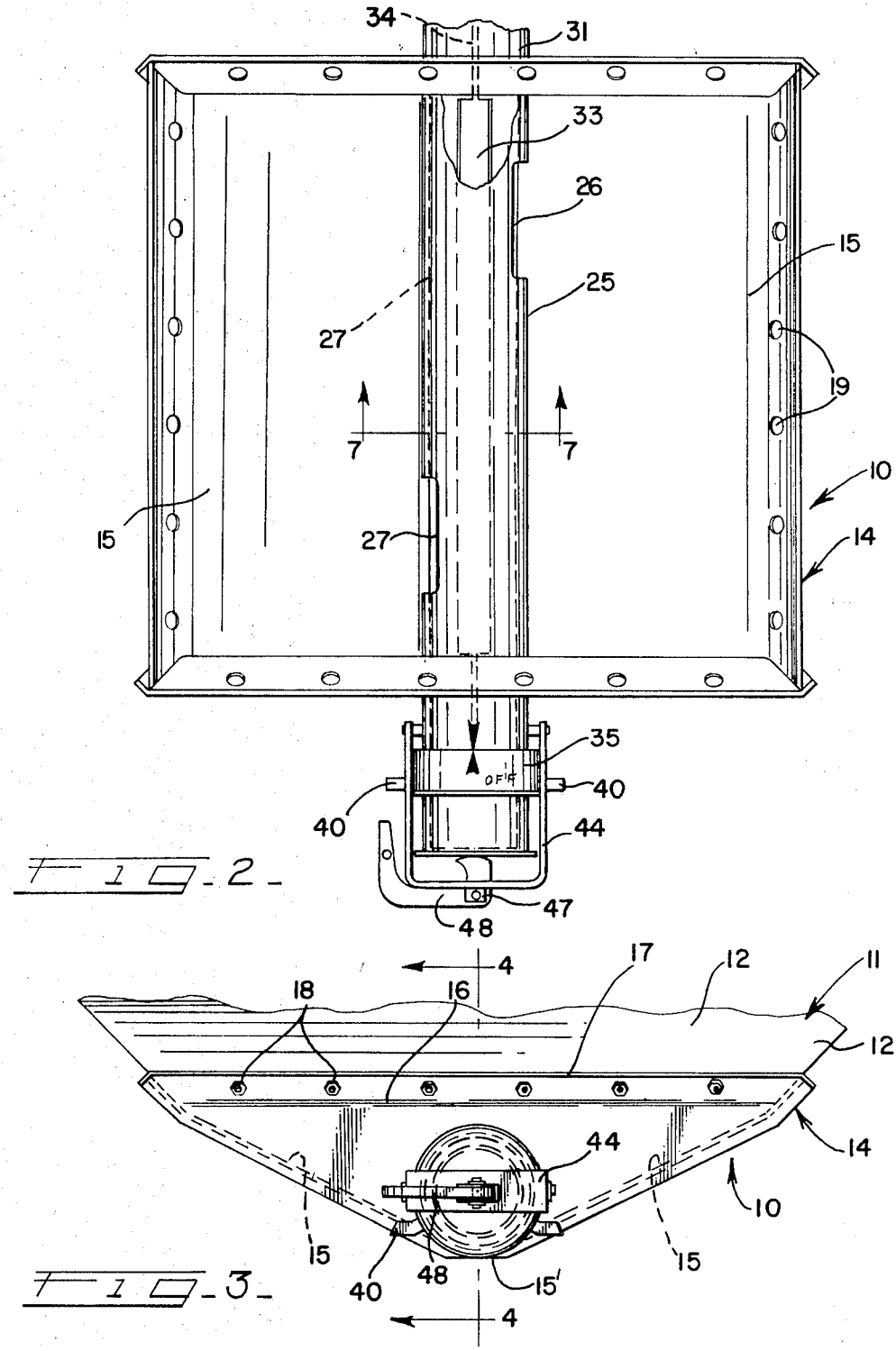

Sept. 8, 1970  W. D. MUNDINGER  3,527,503
PNEUMATIC OUTLET ASSEMBLY FOR HOPPERS
Filed Aug. 5, 1968  4 Sheets-Sheet 3
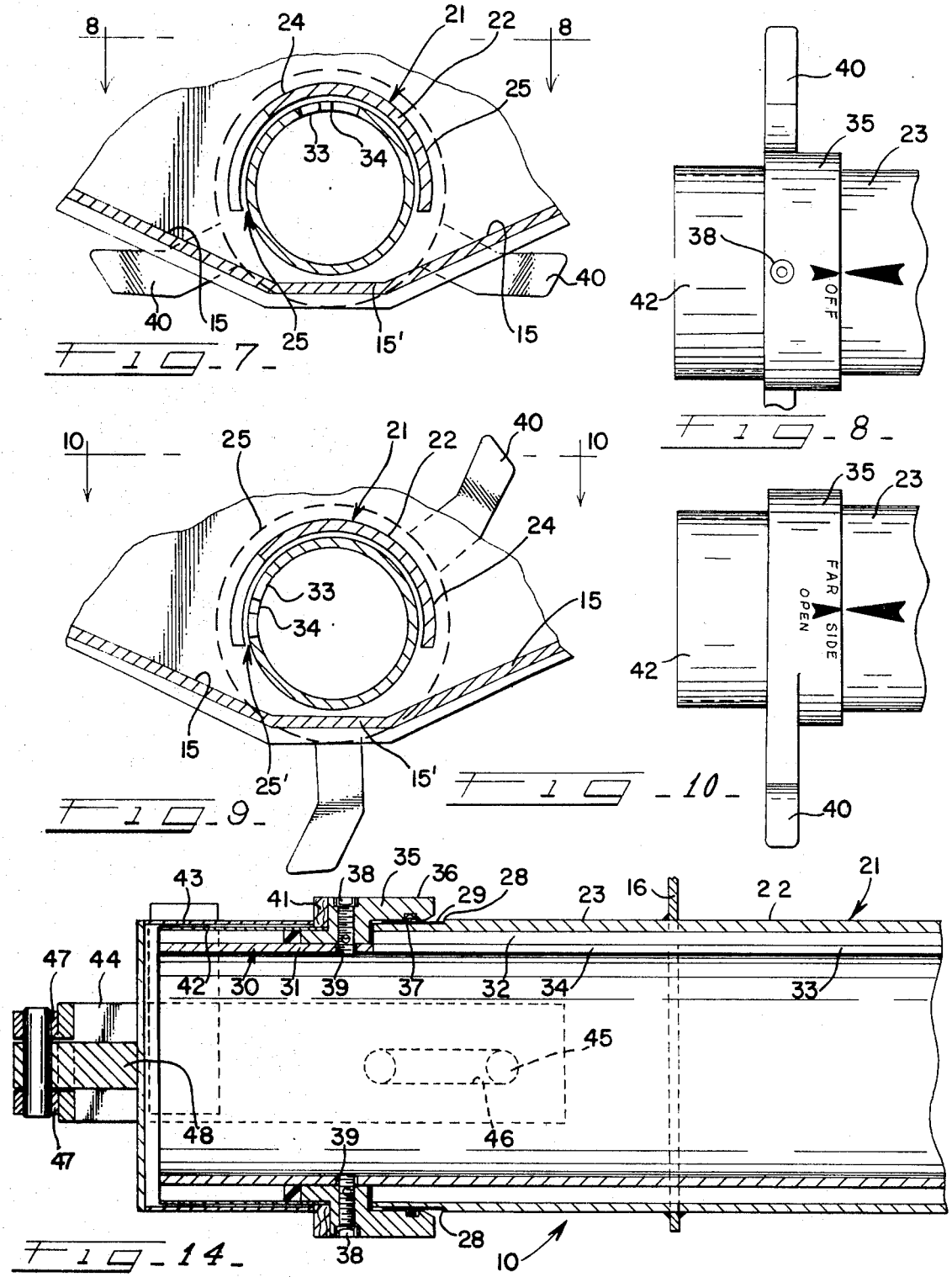
INVENTOR
WILLIAM D. MUNDINGER
BY
ATT'Y.

Sept. 8, 1970                    W. D. MUNDINGER                    3,527,503
PNEUMATIC OUTLET ASSEMBLY FOR HOPPERS
Filed Aug. 5, 1968                                           4 Sheets-Sheet 4
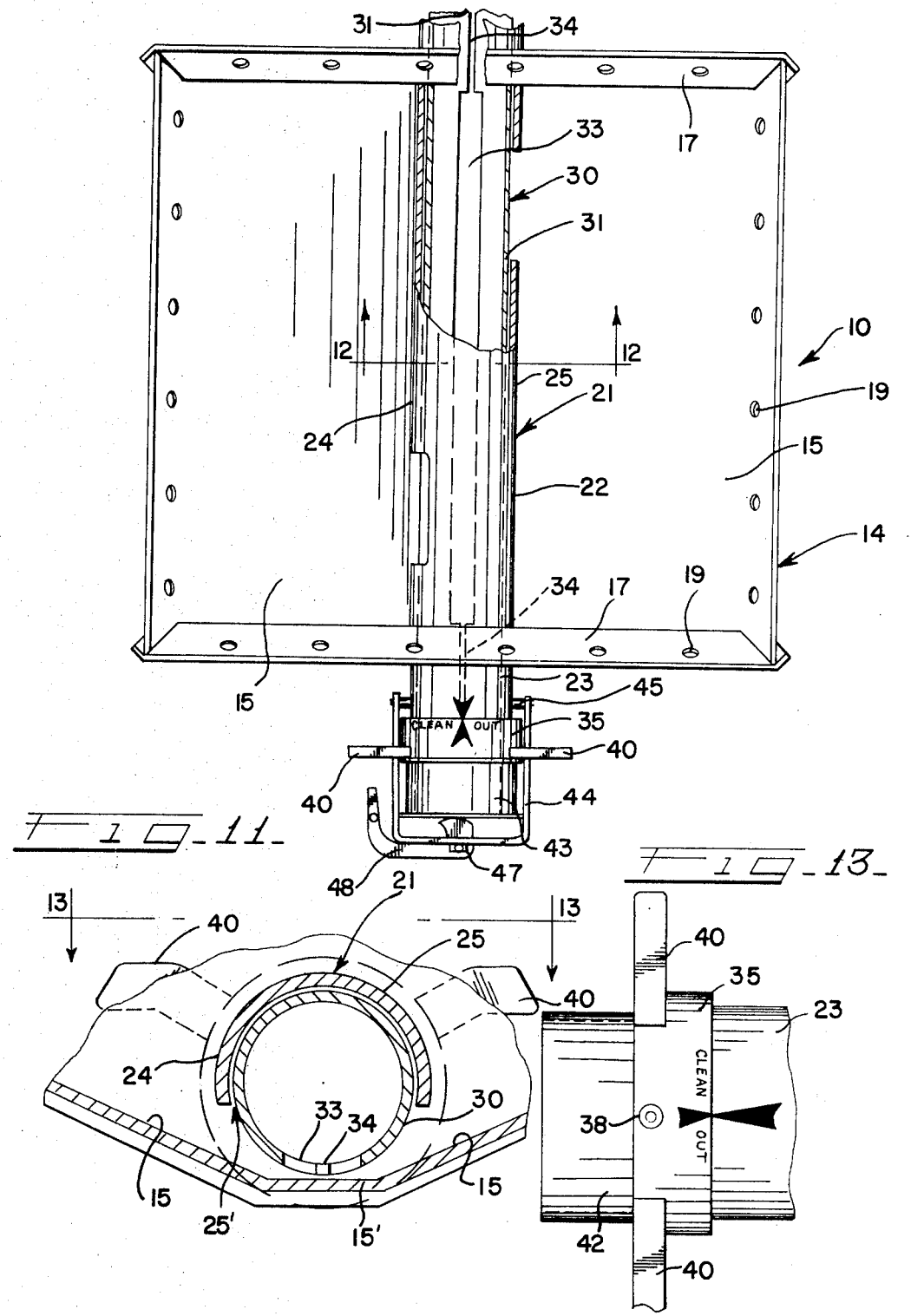
INVENTOR
WILLIAM D. MUNDINGER
BY
ATT'Y.

United States Patent Office 3,527,503
Patented Sept. 8, 1970

1

3,527,503
PNEUMATIC OUTLET ASSEMBLY FOR HOPPERS
William D. Mundinger, Highland, Ind., assignor to Pullman Incorporated, Chicago, Ill., a corporation of Delaware
Filed Aug. 5, 1968, Ser. No. 750,224
Int. Cl. B65g 53/40
U.S. Cl. 302—52                                     10 Claims

ABSTRACT OF THE DISCLOSURE

A pneumatic outlet assembly includes a pan which is connected to the discharge end of a hopper and comprises a stationary tube with an inner section disposed within the pan and having sections projecting outwardly with respect thereto. The inner section is slotted on its bottom surface and is further cut out on opposite sides to provide apertures adjacent opposite ends of the pan. A control tube is rotatably mounted in the stationary tube and includes an elongated intake slot and separate cleanout slots which provide for effective cleanout of the pan and tubes after most of the material has been removed by suction. The control tube is movable to a plurality of indexed positions to provide for the most efficient and rapid discharge of material from the hopper.

BACKGROUND OF THE INVENTION

Field of the invention

The invention relates to the art of hopper discharge arrangements wherein hoppers normally carried by vehicles such as trailers or railway cars transport bulk materials. The discharge of such bulk materials from the hopper is generally effected by a discharge assembly which may either be gravity or pneumatic or a combination of both. The present invention is concerned with a hopper discharge arrangement to be operated by means of a pneumatic outlet assembly which is suitably connected to a vacuum unloading system.

Description of the prior art

The prior art concerned with pneumatic outlets for discharging hoppers has included stationary tubes provided with suitable openings and a control tube rotatable therein with intake provisions for withdrawing material from a discharge pan connected to a hopper. In order to provide for the most efficient discharge, attempts have been made which includes certain opening configurations both in the outer tube and in the control tube with the objective that discharge would be rapid and that the hopper would be effectively emptied. In prior art structures some degree of success has been accomplished but a more improved arrangement has been long needed. The present invention provides an efficient arrangement which permits rapid discharge and complete final cleanout after the majority of the material has been drawn from the hopper.

SUMMARY

The invention comprises an improved structure of a pneumatic outlet assembly which includes intake suction apertures critically located in a stationary tube within a discharge pan for providing and effecting the most rapid discharge of material through a control tube. The control tube also includes intake slots and cleanout openings which are so located as to effect an efficient and complete cleanout of any residue of material remaining after practically all of the bulk material has been withdrawn from the hopper and discharge pan.

2

BRIEF DESCRIPTION OF THE DRAWINGS

FIG. 1 is a perspective view of a pneumatic outlet assembly;
FIG. 2 is a plan view of the outlet assembly shown in FIG. 1;
FIG. 3 is a side elevational view of the outlet assembly of FIG. 2;
FIG. 4 is a cross-sectional view taken substantially along the line 4—4 of FIG. 3 with interior portions of a control means broken away to better illustrate the disclosure;
FIG. 5 is a cross-sectional view taken substantially along the line 5—5 of FIG. 4;
FIG. 6 is a view taken substantially along the line 6—6 of FIG. 5;
FIG. 7 is a cross-sectional view taken substantially along the line 7—7 of FIG. 2;
FIG. 8 is a view taken substantially along the line 8—8 of FIG. 7;
FIG. 9 is a cross-sectional view taken along the line 9—9 of FIG. 1;
FIG. 10 is a view taken substantially along the line 10—10 of FIG. 9;
FIG. 11 is a plan view of an outlet assembly in a certain operating position;
FIG. 12 is a cross-sectional view taken substantially along the line 12—12 of FIG. 11;
FIG. 13 is a view taken along the line 13—13 of FIG. 12; and
FIG. 14 is an enlarged cross-sectional view showing operating details for a tubular extension of the pneumatic outlet assembly.

DESCRIPTION OF THE PREFERRED EMBODIMENT

Referring particularly to FIG. 1 a pneumatic outlet assembly is designated by the reference character 10 and includes a hopper structure 11 having four sloping walls 12 terminating in a discharge opening 13 as best shown in FIG. 1. The discharge opening 13 is enclosed by means of a pan or material receiving receptacle 14 having downwardly sloping bottom walls 15 connected to a horizontal wall portion 15'. The pan or receptacle 14 also includes on opposite sides thereof walls 16 provided with flanges 17 which are suitably connected by means of bolt and nut assemblies 18 through openings 19 provided in the bottom walls 15 and flanges 17 as best shown in FIGS. 1 and 11. The walls 16 are each provided with aligned openings 20 which support a tubular member generally referred to by the reference character 21. If desired the walls 16 may also be inclined so as to slope downwardly inwardly.

The tubular member 21 comprises an inner tubular section 22 and outer tubular sections 23 extending from the tubular section 22 outwardly from the walls 16 as best shown in FIGS. 1 and 4. The inner tubular section 22 is open at its bottom substantially coextensive with its length within the pan 14 and includes arcuate wall portions 24 and 25 which terminate at their ends a distance above the sloping bottom wall portions 15 and therefore provide a slot generally designated by the reference character 25' as best shown in FIGS. 5, 7, 9 and 12.

The arcuate wall portion 25 is provided with a rectangular aperture 26 and as best shown in FIG. 5 the wall portion 24 is provided with a rectangular aperture 27 said apertures, as best shown in FIG. 1, being disposed on opposite ends of the tubular section 22 substantially adjacent vertical walls 16. As best shown in FIG. 14 the ends of the outer tubular sections 23 are each provided with a circumferentially extending undercut portion 28 within which the nylon bearing 29 is suitably secured.

A control tube 30 is rotatably positioned within the tubular member 21 and includes at opposite ends tubular extension portions 31 which project outwardly on opposite sides of the pan 14 and outwardly from the opposite ends of the outer tubular sections 23. The tubular extension portions 31 form with the outer sections 23 an annular space 32. The control tube 30 is also provided with a slot 33 which extends substantially the width of the pan 14. The tubular extensions 31 are also provided with a narrower slot 34 which is in communication with the slot 33 and provides for the cleanout function which will be described. The control tube extension 31 has connected thereto a collar 35 having an annular flange 36 to which is secured a ring seal 37 and which engages the nylon radial bearing 29 in sealing and sliding relation. Set screws 38 suitably connect the collar through openings 39 through the extensions 31 to provide for rotation of the control tube 30 upon rotation of the collar 35. Such rotation is effected by means of a pair of handles 40 which are connected to each collar 35. A gasket 41 is suitably bonded to the collar 35 and a sleeve 42 connected to the collar 35 projects outwardly with respect thereto. The annular space between the sleeve 42 and the outer portion of the extension 31 serves to suitably receive the pipes or tubing of a vacuum unloading system in conventional manner which need not further be described.

In the closed position of the control tube 30 a cap 43 is positioned over the sleeve 42. The cap 43 is retained in closed position by means of a bail 44 suitably pivoted on pins 45 projecting outwardly on opposite sides from the outer tubular section 23. The bail 44 is provided with slots 46 pivotally engaging the pins 45 and facilitating hinging and securing of the bail 44 in position. The cap 43 is provided with ears 47 to which a camming lever 48 is pivotally connected.

THE OPERATION

As best indicated in FIG. 1 the outwardly projecting structures of the pneumatic outlet assembly 10 are symmetrical and a vacuum unloading system may be connected to either side of the pan 14. In the transport position, the collar, as shown in FIG. 2, is rotated to the off position wherein the arrow on the collar 35 will coincide with the arrow marking provided on the outer tubular section 23. In this position, as shown in FIG. 7, the slot 33 of the control tube 30 is covered by the arcuate walls 24-25. When the vehicle containing the hopper 11 arrives at the unloading site one of the caps 43 is removed by rotating the lever 48 which then permits the bail 44 to swing downwardly. Prior to rotation of the control tube 30, it is necessary to unlock the camming lever 48 and permit the bail 44 to swing to its down position.

A suitable tube from a vacuum unloading system can now be inserted to connect around the outer surface of the control tube 30 so that the operation of unloading can begin. It is contemplated that this assembly can also be used with a probe system. A probe system is a vacuum unloading means wherein a tube has connected thereto a pipe, the pipe having an intake aperture which receives material from the pan and discharges the same. In FIG. 1 a probe is shown as being inserted within the assembly and is designated at 49 which includes an opening 50 in registry with the aperture 26.

At the beginning of the operation the operator now turns the collar 35 into the position shown in FIGS. 9 and 10, wherein the far side is now open in that the aperture 26 is in alignment with the slot 33. The vacuum within the control tube 30 now serves to rapidly withdraw the material from the hopper 11 and the pan 14 until the major portion of the material has been removed in this manner. In the probe operation the opening 50 is in registry with the aperture 26 as illustrated in FIG. 1.

After the greatest portion of the material has been removed in this manner the control tube 30 is now rotated to the position shown in FIG. 6 wherein the near side is open and as best shown in FIG. 5 the slot 33 is in registry with the aperture 27 for withdrawing material from the other side of the pan. If the probe is utilized, then the probe 49 is moved outwardly and rotated 180° until the opening 50 is in communication or alignment with the aperture 27. A substantial remainder of the material is thus withdrawn from the interior of the hopper and the remaining operation of cleanout is now to be effected. This is accomplished by rotating the control tube 30 into the position shown in FIG. 13 by rotation of the collar 35 and handles 40. In this position, as shown in FIGS. 11 and 12, the slot 33 is now facing downwardly and is substantially contiguous to the horizontal wall 15′. The slot 33 cleans out the residue which may be remaining on the horizontal wall 15′ and the slots 34 are now to effectively clean out the spaces 32 provided between the tubular extensions 31 and outer sections 23 as best shown in FIG. 14. The high velocity as a result of suction through the slot 34 causes effective cleanout of the space 32 and in cooperation with the slot 33 efficient and complete cleanout of the pan 14 is effected.

With the improved pneumatic outlet assembly disclosed an efficient operation occurs wherein material is rapidly discharged from the pan 14. Also residue of material remaining after the operation has been completed is no longer a problem since complete cleanout is effected by the arrangement shown. The slot 34 need not necessarily be in communication with the slot 33 to achieve the specific purpose desired. The slot 34 can be staggered and can comprise individual openings as well to achieve the desired function. With the cleanout of the space 32 a more sanitary condition exists and the problem of binding of the control tube 30 during rotation is avoided since material cannot become compacted in the space 32.

What is claimed is:

1. For a hopper having a discharge opening, a pneumatic outlet assembly comprising a pan having horizontally spaced walls and a bottom connected to said hopper beneath said discharge opening to enclose the same and to receive material therefrom, a tubular member including a tubular inner section disposed beneath said discharge opening, being supported within said pan, and an outer section projecting outwardly from said pan, said tubular inner section having an opening extending horizontally, opening downwardly toward said bottom and being defined by horizontally spaced arcuate wall portions terminating above said bottom, a control tube rotatably positioned within said tubular member including a second opening in an open position being in registry with said first opening, and in closed position, being covered by said wall portions, said control tube having a tubular portion communicating with said second opening and extending outwardly within said outer section, opening means in said tubular portion, means on said tubular portion adapted to connect to vacuum uploading means, and means for rotating said control tube to open and closed positions, said opening means providing for the cleanout of material disposed within an annular space between said outer section and said tubular portion, and said opening means being substantially longitudinally coextensive with said space.

2. The invention in accordance with claim 1, said opening means having a cross-sectional dimension substantially less than that of said second opening.

3. The invention in accordance with claim 1, said opening means comprising a relatively narrow slot and said second opening comprising an elongated wider slot.

4. The invention in accordance with claim 3, said narrow slot communicating with said second slot,

5. The invention in accordance with claim 4,
said rotating means including a collar connected to said control tube, said collar having an annular flange overlapping an end of said outer section,
seal means on said flange engaging said end in sealing and sliding relation, and
handle means connected to said collar.

6. The invention in accordance with claim 5,
including a sleeve disposed over said tubular portion of said control tube to provide a circumferentially extending space therebetween, for receiving a tubular connection of a vacuum unloading means.

7. For a hopper having a discharge opening, a pneumatic outlet assembly comprising a pan having horizontally spaced walls and a bottom connected to said hopper beneath said discharge opening to enclose the same and to receive material therefrom,
a tubular member including a tubular inner section disposed beneath said discharge opening, being supported within said pan, and an outer section projecting outwardly from said pan,
said tubular inner section having an elongated slot extending horizontally substantially coextensive with said inner section, opening downwardly toward said bottom and being defined by horizontally spaced arcuate wall portions terminating above said bottom,
said inner section having an aperture disposed in one of said arcuate wall portions adjacent one of said vertical walls of said pan, and a second aperture in said other arcuate wall disposed adjacent the other vertical wall of said pan,
a control tube rotatably positioned within said tubular member including a second slot in an open position being in alignment with said first slot, and in the closed position being covered by said wall portions, said control tube having a tubular portion communicating with said second slot and extending outwardly within said outer section,
means on said tubular portion adapted to connect to vacuum unloading means, and means for rotating said control tube to open and closed positions,
said control tube being rotatable to positions with said second slot registering with either of said apertures providing for the discharge of materials from opposite sides of said pan.

8. The invention in accordance with claim 7,
including indicating means on said collar and said outer section denoting the position of said control tube slot relative to said apertures and said first slot.

9. The invention in accordance with claim 7,
said control tube tubular portion including opening means providing for the cleanout of material disposed within an annular space between said outer section and said tubular portion.

10. For a hopper having a discharge opening, a pneumatic outlet assembly comprising a pan connected to said hopper to enclose the same and to receive material from said discharge opening,
a tubular member including a tubular inner section disposed within said pan and an outer tubular section projecting outwardly from said pan, said inner section having an elongated slot in a lower portion of said tube extending horizontally and opening downwardly toward said pan,
a control tube rotatably positioned within said tubular member and having at least one intake opening registering with said elongated slot,
means on said control tube for manually moving the same to register with said slot or to a position relative to said tubular member whereby said intake opening is covered,
said control tube including a tubular extension projecting outwardly of said pan within said outer tubular section and being of a smaller diameter than said tubular section to provide therewith an annular space coextensive with the projection of said tubular section, and
opening means on said extension communicating with said space to withdraw materials therefrom during the application of vacuum means to said control tube.

References Cited
UNITED STATES PATENTS

| | | | |
|---|---|---|---|
| 3,136,584 | 6/1964 | Whitlock | 302—52 |
| 3,258,173 | 6/1966 | Koranda | 302—52 |
| 3,408,117 | 10/1968 | Koranda | 302—52 |

ANDRES H. NIELSEN, Primary Examiner